(12) United States Patent
Wahl et al.

(10) Patent No.: US 10,617,250 B2
(45) Date of Patent: Apr. 14, 2020

(54) KIT OF A HANGING SYSTEM

(71) Applicant: INTER IKEA SYSTEMS B.V., Delft (NL)

(72) Inventors: David Wahl, Stockholm (SE); Bo Zhang, Älmhult (SE)

(73) Assignee: Inter Ikea Systems B.V., Delft (NL)

( * ) Notice: Subject to any disclaimer, the term of this patent is extended or adjusted under 35 U.S.C. 154(b) by 808 days.

(21) Appl. No.: 15/105,799

(22) PCT Filed: Dec. 19, 2014

(86) PCT No.: PCT/EP2014/078808
§ 371 (c)(1),
(2) Date: Jun. 17, 2016

(87) PCT Pub. No.: WO2015/091986
PCT Pub. Date: Jun. 25, 2015

(65) Prior Publication Data
US 2016/0316952 A1 Nov. 3, 2016

(30) Foreign Application Priority Data

Dec. 20, 2013 (WO) .................. PCT/EP2013/077616

(51) Int. Cl.
| | |
|---|---|
| *A47B 96/00* | (2006.01) |
| *A47H 1/124* | (2006.01) |
| *A47H 1/104* | (2006.01) |
| *A47H 1/144* | (2006.01) |
| *A47H 1/122* | (2006.01) |
| *A47H 1/04* | (2006.01) |
| *F16M 13/02* | (2006.01) |

(52) U.S. Cl.
CPC .............. *A47H 1/124* (2013.01); *A47H 1/04* (2013.01); *A47H 1/104* (2013.01); *A47H 1/122* (2013.01); *A47H 1/144* (2013.01); *F16M 13/027* (2013.01)

(58) Field of Classification Search
CPC .......... A47H 1/124; A47H 1/04; A47H 1/104; A47H 1/122; A47H 1/144; F16M 13/027
USPC .......................... 248/222.51, 222.52, 224.7
See application file for complete search history.

(56) References Cited

U.S. PATENT DOCUMENTS

| | | | |
|---|---|---|---|
| 3,183,546 A | 5/1965 | Heller et al. | |
| 3,273,197 A | 9/1966 | Ford | |
| 3,344,463 A | 10/1967 | Znamirowski | |
| 3,424,225 A * | 1/1969 | Magnusson ............ | A47H 1/104 16/95 D |

(Continued)

FOREIGN PATENT DOCUMENTS

| | | |
|---|---|---|
| CN | 101268423 A | 9/2008 |
| DE | 8715256 U1 | 3/1988 |

(Continued)

*Primary Examiner* — Gwendolyn W Baxter
(74) *Attorney, Agent, or Firm* — Merchant & Gould P.C.

(57) ABSTRACT

A kit of a hanging system includes one or more rails, one or more locking elements, one or more connecting pieces, and one or more ceiling attachments. The kit may be used for hanging curtains from a rail. Each locking element and each connecting piece are either used separately or together. Each ceiling attachment is used with a locking element. The locking element is either used to connect two rails to each other or to attach the connecting piece to the rail and to lock the connecting piece in a desired position on the rail.

20 Claims, 15 Drawing Sheets

(56) References Cited

U.S. PATENT DOCUMENTS

| | | | | |
|---|---|---|---|---|
| 3,927,437 A | * | 12/1975 | Ford | A47H 1/144 16/94 R |
| 4,034,439 A | * | 7/1977 | Kohne | A47H 1/04 16/96 R |
| 4,068,345 A | | 1/1978 | Hehl et al. | |
| 4,254,813 A | * | 3/1981 | Vecchiarelli | A47H 2/00 160/19 |
| 5,060,710 A | * | 10/1991 | Haarer | A47H 1/144 160/178.1 R |
| 5,232,039 A | * | 8/1993 | Shapiro | A47H 2/00 160/330 |
| 7,043,795 B2 | | 5/2006 | Bosgoed | |
| 8,099,904 B2 | | 1/2012 | Saccon | |
| 2011/0011023 A1 | | 1/2011 | Gulbrandsen et al. | |
| 2013/0241380 A1 | | 9/2013 | Townsend, Jr. | |

FOREIGN PATENT DOCUMENTS

| | | |
|---|---|---|
| FR | 2600219 A1 | 10/2007 |
| RU | 2263454 C2 | 11/2005 |
| WO | WO 2005/048788 A1 | 6/2005 |

\* cited by examiner

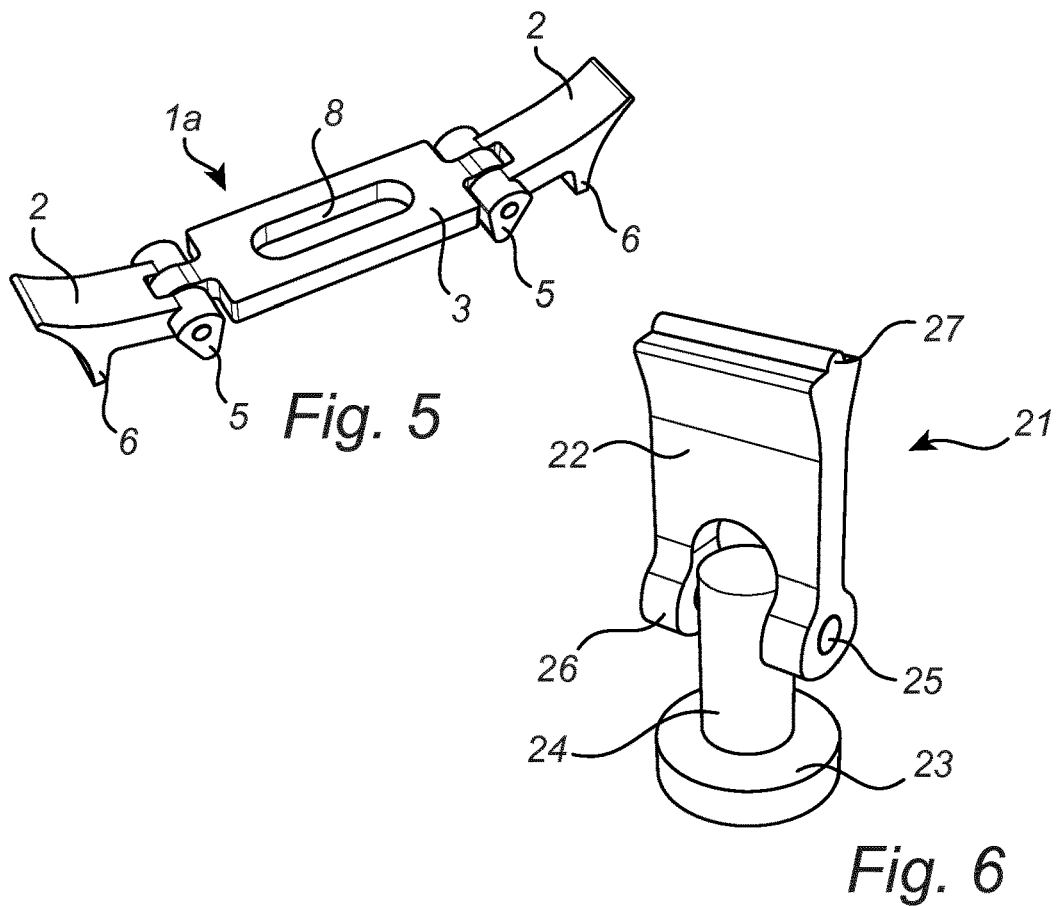
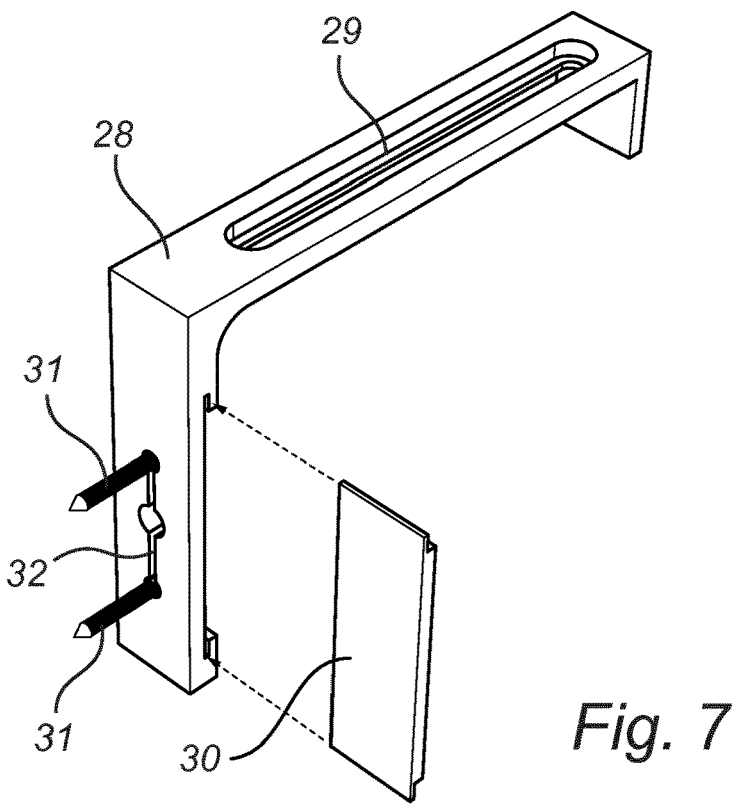

KIT OF A HANGING SYSTEM

This application is a National Stage Application of PCT/EP2014/078808, filed 19 Dec. 2014, which claims benefit of PCT/EP2013/077616, filed 20 Dec. 2013 in Europe, which applications are incorporated herein by reference. To the extent appropriate, a claim of priority is made to each of the above disclosed applications.

TECHNICAL FIELD

The present invention concerns a kit of a hanging system comprising one or more rails.

The kit comprises one or more locking elements, one or more connecting pieces and one or more ceiling attachments. The different parts of the kit are often used in connection with a rail, for instance a curtain rail.

BACKGROUND

The parts of the kit of the present invention has especially been developed for hanging of curtains, but a person skilled in the art realizes that it may also be used for hanging other objects or connecting objects to each other.

When hanging for instance curtains, many different systems are used. Such hanging systems may comprise rails of different sizes and outer forms, and brackets or the like for receiving the rails. The brackets or the like may be fastened to walls or ceilings. Normally, the rails and connection or fixation parts to co-operate with the rails are given a specific design. This means that different parts can only be used for a specific system and cannot be used for different systems. Often there are also specific parts for different sizes in one system.

SUMMARY

The kit of the present invention is preferably used for a curtain hanging system and more preferably a curtain rail hanging system. It is used for either a single curtain or for several curtains. It may also be used for hanging rails for other parts than curtains. The kit also includes parts not solely intended for rails. One intention of the present invention is to be able to use the same kit for a number of different situations. Thus, one could say that the kit is a kind of universal hanging system, which will reduce the number of components needed for hanging different kinds of rails. It is for example possible to use the kit of the present invention with different rails, rods etc. for hanging curtains.

The hanging system of the present invention can be used in several different areas. Even though it is mainly shown in connection with curtains, with the rail or rails in a generally horizontal orientation, a person skilled in the art realizes that it may be used for hanging of different things. It is also possible to use with rails of vertical or any other orientation. Possible further use includes hanging of shelves, signs, lamps etc.

According to one aspect of the present invention, it provides means for flexible placing of connecting parts in a rail or the like.

According to the present invention a kit is provide, which kit may be used in different hanging systems, for example for hanging curtains. The kit comprises one or more locking elements, one or more connecting pieces and one or more ceiling attachments. The locking element may be used to connect two rails to each other or to lock the connecting piece or fixation piece at desired positions along a rail. The connecting piece is used to connect different parts to the rail or to each other. The ceiling attachment is used to fasten a rail to a ceiling or a wall.

Further objects and advantages of the present invention will be obvious to a person skilled in the art when reading the detailed description below.

BRIEF DESCRIPTION OF THE DRAWINGS

The invention will be explained further below by way of examples and with reference to the enclosed drawings. In the drawings:

FIG. 5 is a perspective view of a third embodiment of a locking element of the kit, FIG. 6 is a perspective view of a connecting piece of the kit, FIG. 7 is a perspective view of a wall bracket that can be used together with parts of the kit.

DETAILED DESCRIPTION

The expressions "horizontal", "vertical", "lower", "upper" and similar expressions, as used in this description, are in view of the Figs. referred to or in view of the normal use of respective component.

A kit for a hanging system according the present invention comprises one or more locking elements 1, 11, 1a one or more connecting pieces 21 and one or more ceiling attachments 33.

Figure 1:
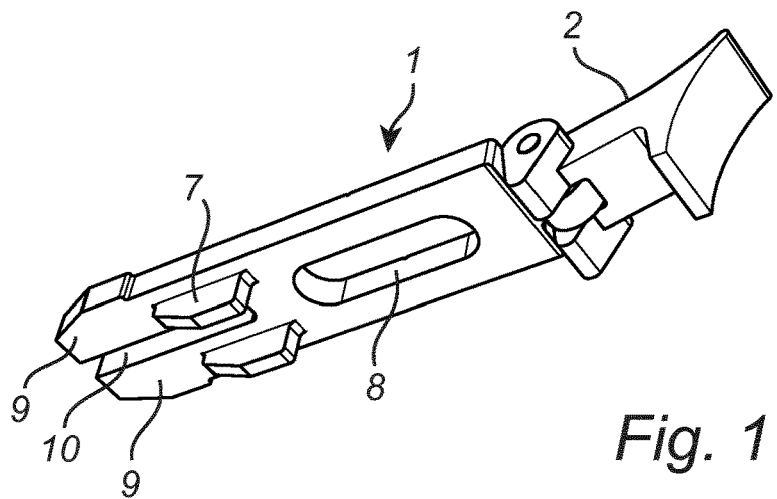
FIG. 1 is a perspective view of a first embodiment of a locking element of a kit for a hanging system.
Figure 2:
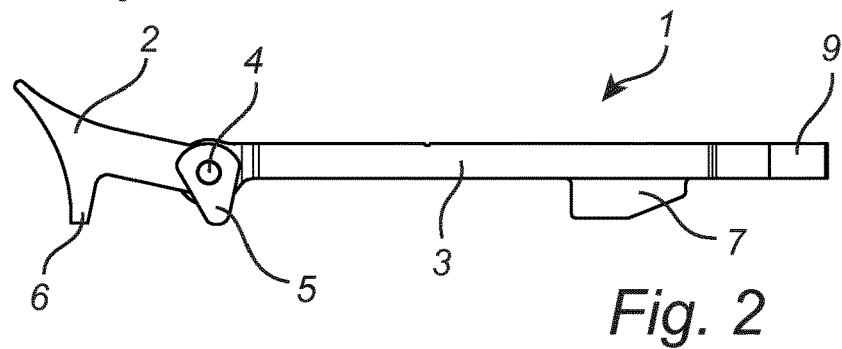
FIG. 2 is side view of the locking element of FIG. 1.

In FIGS. 1 and 2 a first embodiment of a locking element 1 is shown. The locking element 1 has a generally elongated shape with an arm 2 at one end of a flat central part 3. The arm 2 is a separate part and is connected to the central part 3 of the locking element 1 by means of a spindle 4. By means of the spindle 4 the arm 2 can be turned upwards in relation to the central part 3 of the locking element 1. The arm 2 has a protruding stop cam 5 at the spindle 4 and a protruding cam 6 at the outer end of the arm 2. The stop cam 5 is an integrated part of the arm 2 and the arm 2 has a shoulder at the stop cam 5. The width of the shoulder of the arm 2 is larger than for the rest of the cam 2. The width at the stop cam 5 of the arm 2 corresponds with the width of the central part 3. The function of said cams 5, 6 will be explained further below. The locking element 1 has two fingers 9 at the end of the central part 3 opposite the arm 2. A gap 10 is formed between the fingers 9, which gap 10 is open outwards. A boss 7 is placed on each finger 9 at the junction with the central part 3 and which boss 7 protrudes in the same direction as the cams 5, 6 of the arm 2. The central part 3 has an elongated through opening 8.

Figure 3:
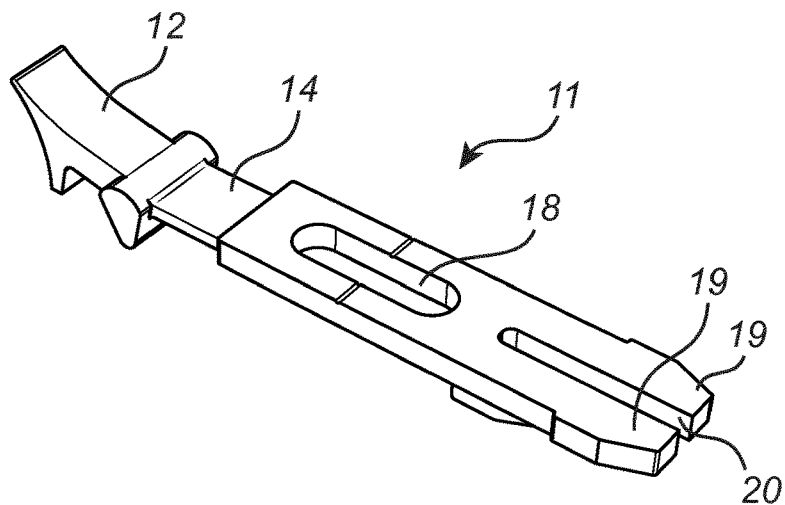
FIG. 3 is a perspective view of a second embodiment of a locking element of the kit.
Figure 4:
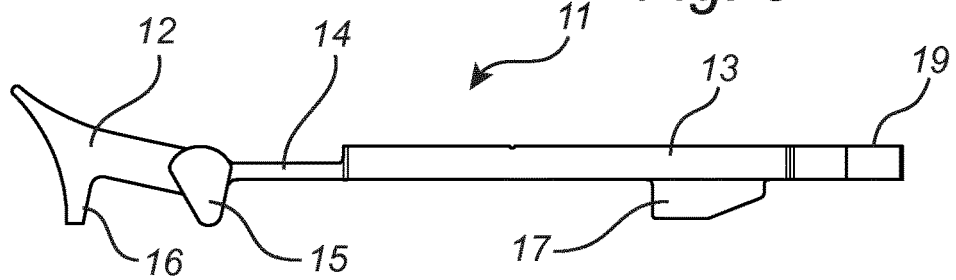
FIG. 4 is a side view of the locking element of FIG. 3.
Figure 8:
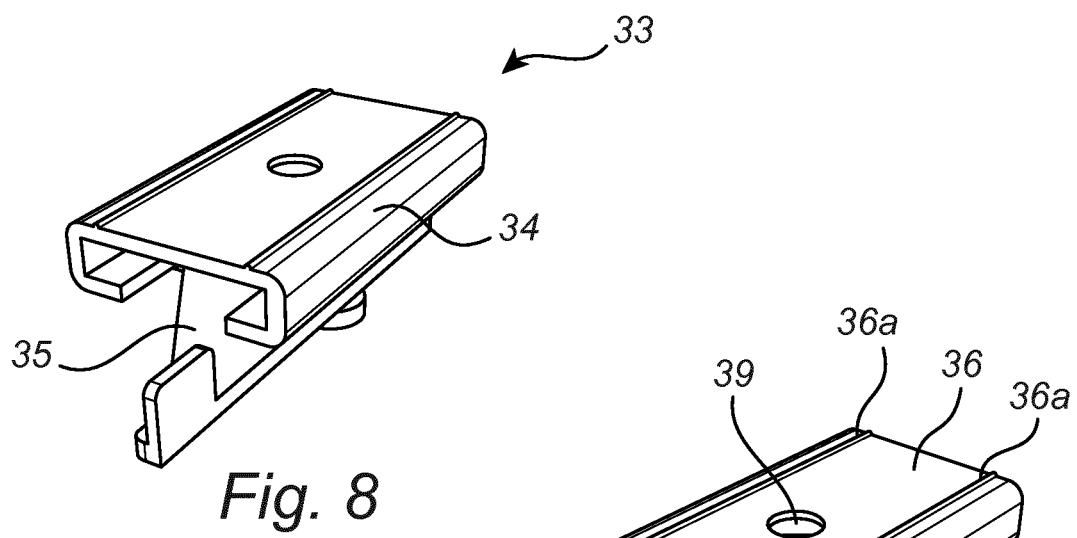
FIG. 8 is a perspective view of a ceiling attachment of the kit.

In FIGS. 3 and 4 a second embodiment of a locking element 11 is shown. The locking element 11 has several features in common with the locking element 1 of the first embodiment. Thus, it has a generally elongated shape with an arm 12 at one end of a flat central part 13. In the second embodiment the arm 12 is connected to the central part 13 by means of an intermediate bending part 14 and is not a separate part connected by means of a spindle. The locking element 11 of the second embodiment is normally made in one piece. The intermediate bending part 14 is less wide than the central part 13. In the same way as for the first embodiment the arm 12 of the locking element 11 of the second embodiment has a stop cam 15 and a further cam 16. The stop cam 15 is placed adjacent the intermediate bending part 14. The width of said stop cam 15 is the same as the width of the central part 13 and larger than the widths of the arm 12 and the intermediate bending part 14. The end of the locking element 11 of the second embodiment opposite the arm 12 has also two fingers 19 with a gap 20 there between in the same way as for the first embodiment. The fingers 19 have bosses 17 and an elongated through opening 18 corresponding with the bosses 7 and the elongated through opening 8, respectively, of the locking element 1 of the first embodiment.

In FIG. 5 a third embodiment of a locking element 1a is shown. The third embodiment of the locking element 1a differs from the locking element 1 of the first embodiment in that it has two arms 2, placed at opposite ends of a central part 3, in stead of one arm 3 and finger 9 at opposite ends. As the arms 2 of the third embodiment of the locking element 1a correspond with the arm 2 of the first embodiment of the locking element 1, it will not be described further here.

Use and function of the different embodiments of the locking element 1, 1a, 11 will be discussed further below.

In FIG. 6 a connecting piece 21 is shown. The connecting piece 21 comprises a plate 22, a rod 24 and a disc 23. The plate 22 is placed at an upper end of the rod 24 and is connected to the rod 24 at the end by means of a spindle 25. By means of the spindle 25 the plate 22 can be turned between a raised vertical position and a lowered horizontal position. The disc 23 is fixed to the lower part of the rod 24 in a perpendicular position in relation to the rod 24. Normally, the rod 24 and the disc 23 are made as an integrated single part. The area of the plate 22 surrounding the spindle 25 is formed to provide cams 26. The plate 22 has a flared end 27 opposite the end receiving the spindle 25. The connecting piece 21 is often used with one of the locking elements 1, 11.

In FIG. 7 one example of a wall bracket 28 is shown. The wall bracket 28 has an elongated through opening 29, in which through opening the connecting piece 21 may be received. The wall bracket 28 is fastened to a wall by means of screws 31 received in an elongated through opening 32. In the shown embodiment of the wall bracket 28, a plate 30 can be slid into grooves of the wall bracket to cover heads of the screws 31. The plate 30 may be held in place at the wall bracket 28 by means of a friction pad (not shown) made of elastic material, such as rubber, and being arranged in a through opening of the wall bracket 28. An opening suitable for holding such a friction pad is shown in FIG. 7, between the two screws 31, i.e. at the middle of the elongated opening 32. The co-operation between the wall bracket 28 and the connecting piece 21 will be discussed further below.

Figure 9:
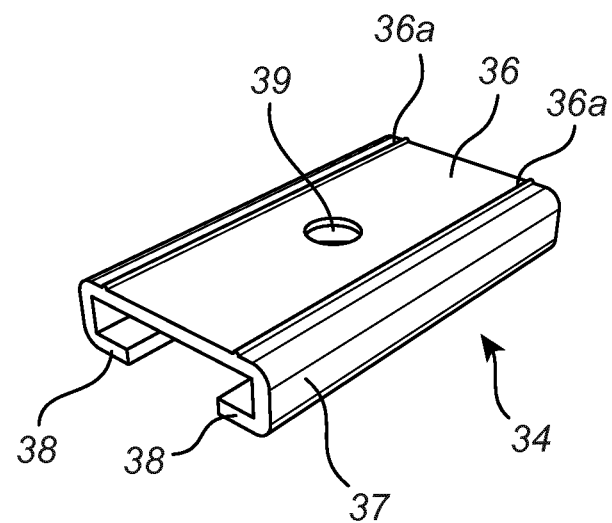
FIG. 9 is a perspective view of a house of the ceiling attachment of FIG. 8.
Figure 10:
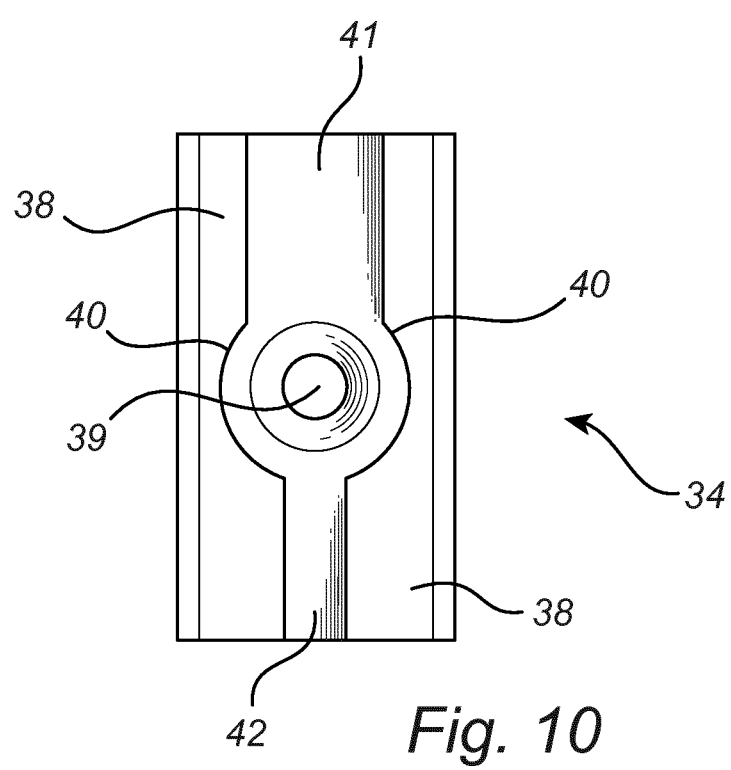
FIG. 10 is a plan view of the house of FIG. 9.
Figure 11:
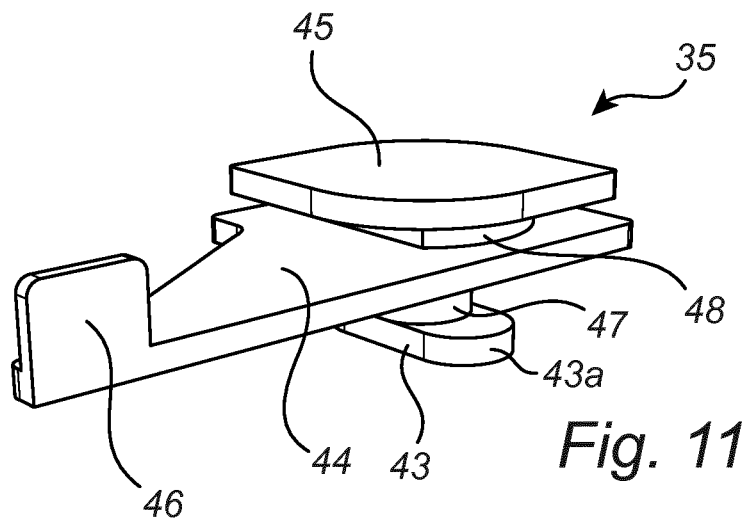
FIG. 11 is a perspective view of a locking element of the ceiling attachment of FIG. 8.
Figure 12:
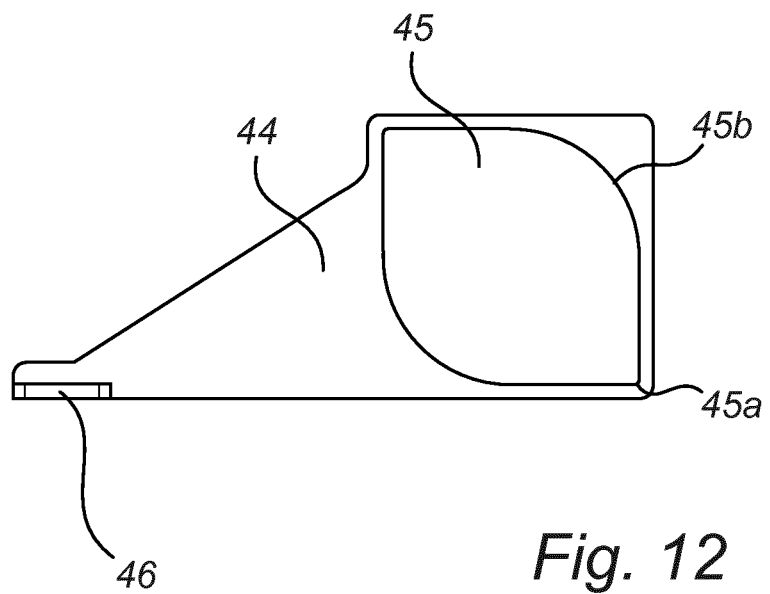
FIG. 12 is a plan view of the locking element of FIG. 11.

In FIGS. 8 to 12 a ceiling attachment 33 is shown. The ceiling attachment 33 is used to attach a rail to the ceiling. The ceiling attachment 33 comprises two separate parts, a house 34 and an attachment element 35. The house 34 as shown in FIGS. 9 and 10 has the form of a rail, with a flat part 36, two side walls 37 at opposite sides of the flat part 36 and two flanges 38 at the side walls 37 opposite the flat part 36. On the side of the house 34 to be facing a ceiling, the flat part 36 has two parallel ridges 36a. The ridges 36a extend the total length of the flat part 36 and will assist at the fixation of the house 34 to a ceiling. The free edges of the flanges 38 are facing each other. The side walls 37 are perpendicular to the flat part 36 and the flanges 38, respectively. The flat part 36 has a through opening 39 placed in the middle of the flat part 36. Each flange 38 has a curved recess 40. The curved recesses 40 are placed opposite each other in the area of the through opening 39 of the flat part 36. The width of each flange 38 differs on opposite sides of the curved recess 40. Whereby a groove formed between the free edges of the flanges 38 have different widths, giving a comparatively wide groove 41 on one side of the recesses 40 and a comparatively narrow groove 42 on the other side. As shown in FIG. 11, the attachment element 35 has a central part 44 with an attaching plate 43 on one side and a locking plate 45 on the opposite side of the central part 44. The central part 44 has a rectangular form in an area where the attaching plate 43 and the locking plate 45 are placed on opposite sides. The central part 44 has further an arm-like triangular form on one side, merging with the area having a rectangular form. At a free end of the central part opposite the part having a rectangular form, a protruding flange 46 is arranged. Said flange 46 is to facilitate handling in a way which will be described further below. The attaching plate 43 is connected to the central part 44 by means of an elliptic rod 47, having different widths in two perpendicular directions. The attaching plate 43 has the form of pins 43a projecting from opposite sides of the elliptic rod 47. The widths of said pins 43a correspond with the length of the minor axis of the elliptic rod 47. The major axis of the elliptic rod 47 is parallel with the pins 43a. The locking plate 45 is connected to the central part 44 by means of an upper rod 48. The locking plate 45 has two opposite corners 45a with straight parts meeting at the corners and two opposite curved parts 45b between the straight parts meeting at the corners 45a. The curved parts 45b of the locking plate facilitates turning of the attachment element 45 inside the house 34. The upper rod 48 connecting the central part 44 with the locking plate 45 has a cross-section with two opposite curved sides 48a and two opposite straight sides 48b (FIG. 18c). The outer distance between the curved sides 48a of the upper rod 48 is larger than the outer distance between the straight sides 48b of the upper rod 48. The attaching plate 43 and the locking plate 45, respectively, are arranged in parallel with and at distances to the central part 44 and with the elliptic rod 47 and the upper rod 48 on a common axis.

Figure 13:
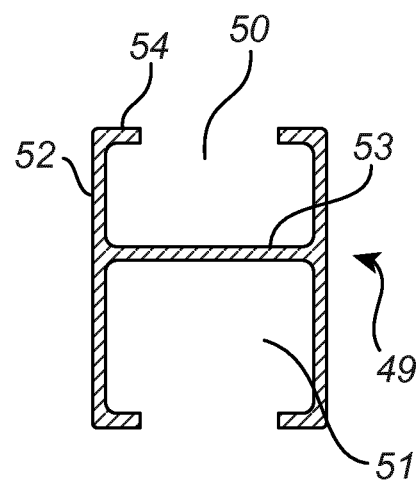
FIG. 13 is an end view of a rail which the kit can be used with, FIG. 14 is an end view of an alternative rail.
Figure 14:
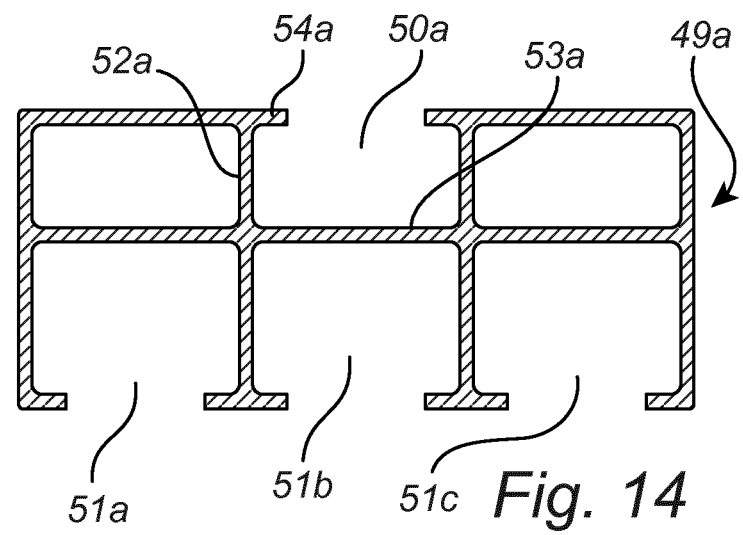

In FIGS. 13 and 14 two different embodiments of rails 49, 49a are shown, which rails 49, 49a may be used with the kit of the present invention.

The rails 49, 49a can be rails for curtains and each has an open upper space 50, 50a and one or more open lower spaces 51, 51a, 51b, 51c separated by a partition 53, 53a. The locking element 1 is to be received in the open upper space 50, 50a and a curtain may be received in each lower space 51, 51a, 51b, 51c. Thus, the rails 49, 49a may be designed to hold one or more curtains in a single track, as indicated in FIG. 13, or two or more curtains placed parallel to each other in separate tracks, as indicated in FIG. 14. Depending on whether one curtain or several curtains are to be received in the rail 49, 49a, the dimensions and design of the lower spaces 51, 51a, 51b, 51c may differ. The open upper spaces 50, 50a of the rails 49, 49a, receiving the locking elements 1, will normally have the same dimensions and design, irrespectively of how many curtains are to be received in the rails 49, 49a.

Each upper space 50, 50a is open upwards with walls 52, 52a projecting upwards from the partition 53, 53a. The walls 52, 52a end with upper edges 54, 54a, having a horizontal extension and directed towards each other. In use the central part 3, 13 of a locking element 1, 1a, 11 is to be placed below the upper edges 54, 54a, whereby the locking element 1, 1a, 11 is inserted in the rail 49, 49a from one open end and slid to the desired position.

The locking element 1, 1a, 11 can be used to connect two rails 49 to each other. The locking element 1, 1a, 11 may also be used to lock the connecting piece 21 in a desired position in a single rail 49, 49a. Thus, the locking element 1, 1a 11 is to be received in a single rail 49, 49a or to connect two rails 49, 49a end to end to each other.

Even though a connecting piece 21 is shown received in the locking element 1 in FIGS. 15a to 15d, it is not necessary to have to have a connecting piece 21 in the locking element 1 to connect two rails 49 to each other. To connect two rails 49, 49a to each other only the locking element 1, 1a, 11 need to be used. To connect two rails 49, 49a to each other the locking element 1, 1a, 11 is first slid into the upper space 50, 50a of a first rail 49, 49a. The locking element 1, 1a, 11 is slid in a distance corresponding with about half the length of the locking element 1, 1a, 11. Then a second rail 49, 49a is slid onto the protruding half of the locking element 1, 1a, 11.

Figure 15A:
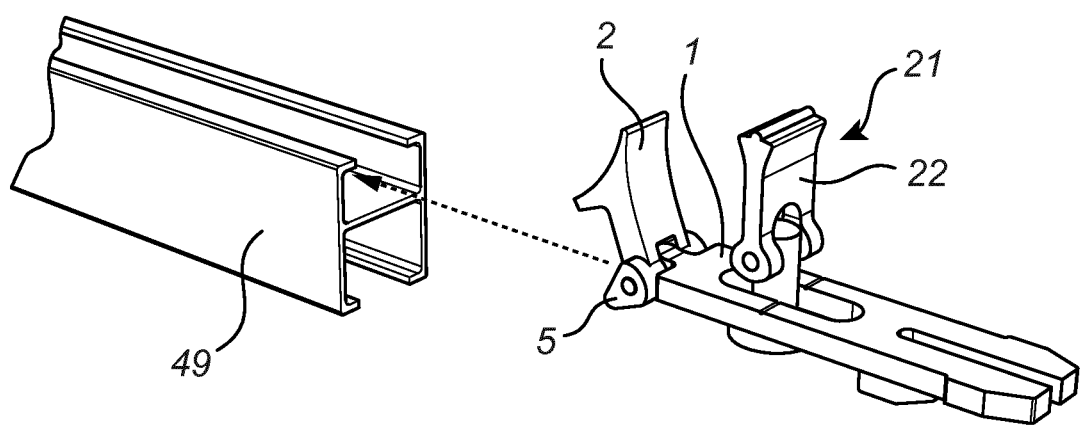
FIGS. 15a to 15d are perspective views illustrating connection of two rails using the locking element of the first embodiment, and in FIG. 15d an alternative placement of the locking element along the rail is indicated.
Figure 15B:
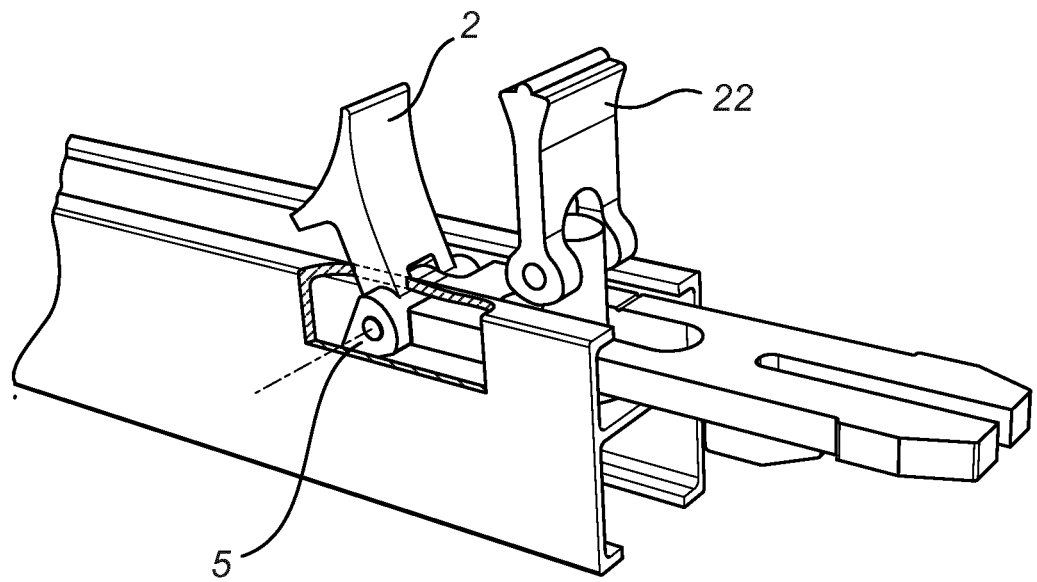
Figure 15C:
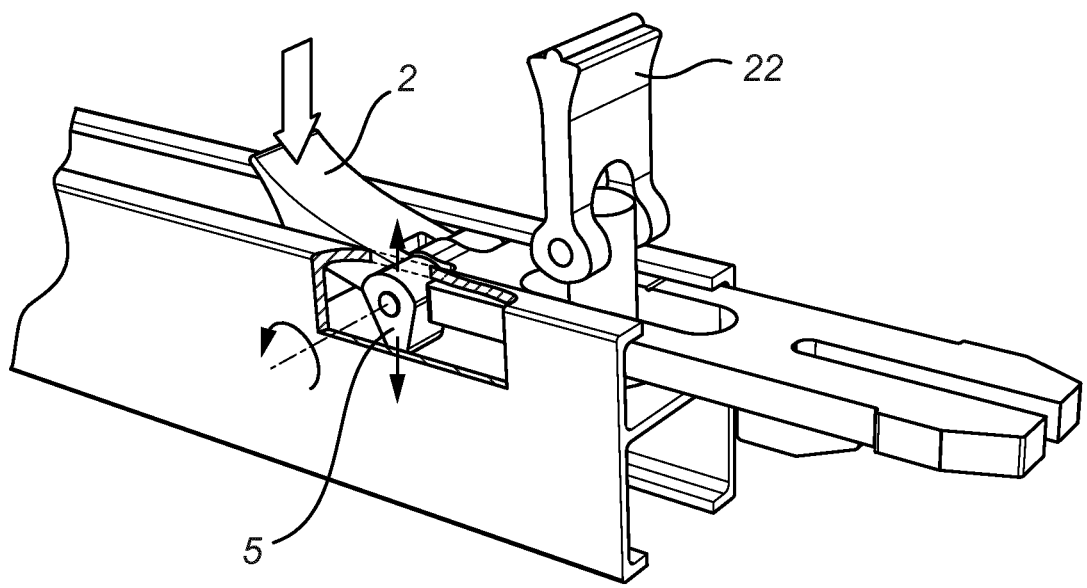
Figure 15D:
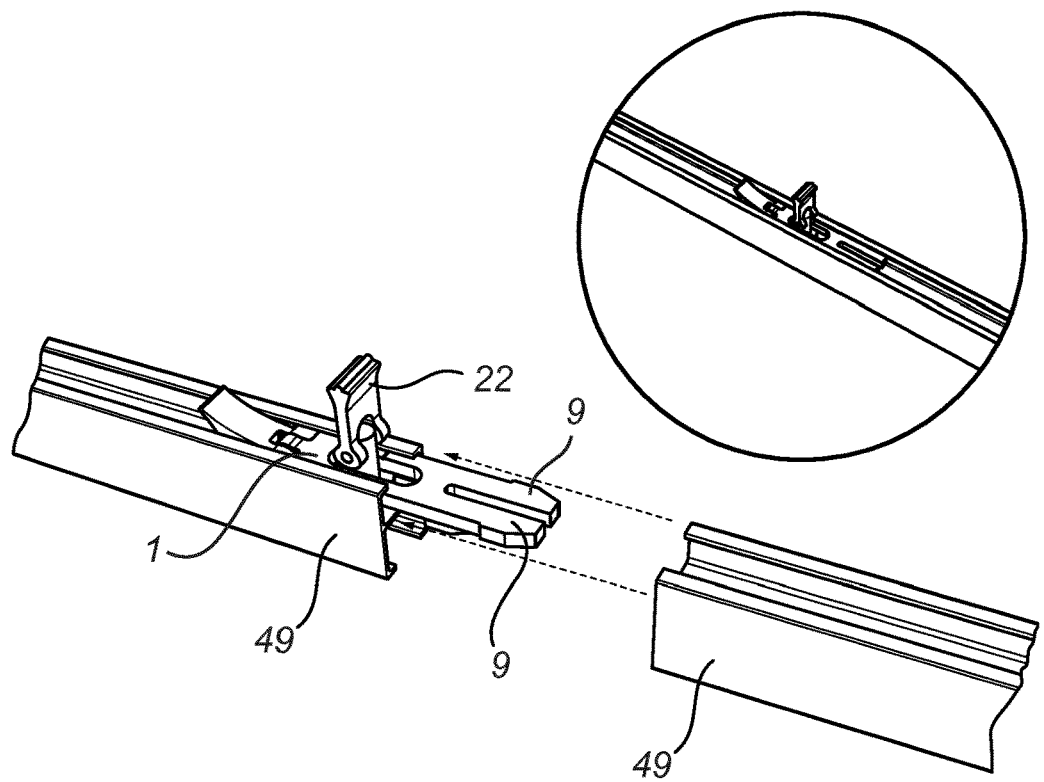
Figure 15E:
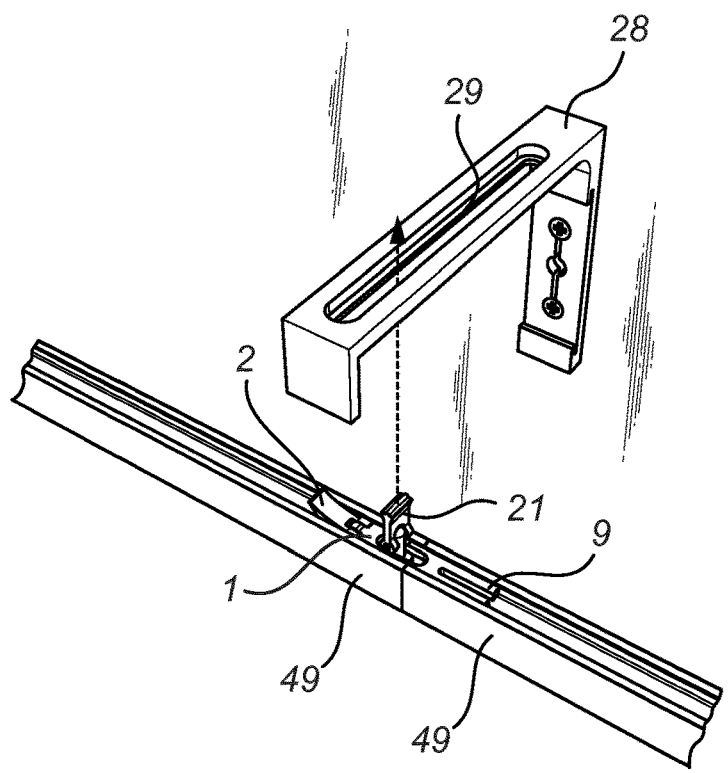
FIGS. 15e to 15g are perspective views illustrating connection of a rail to a wall bracket.
Figure 15F:
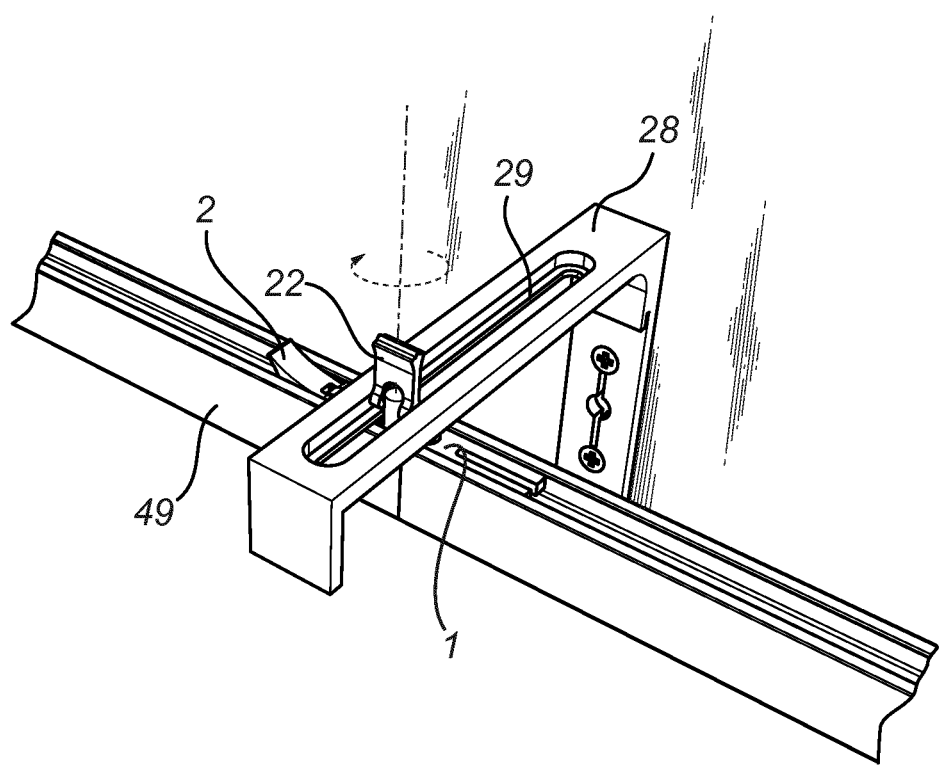
Figure 15G:
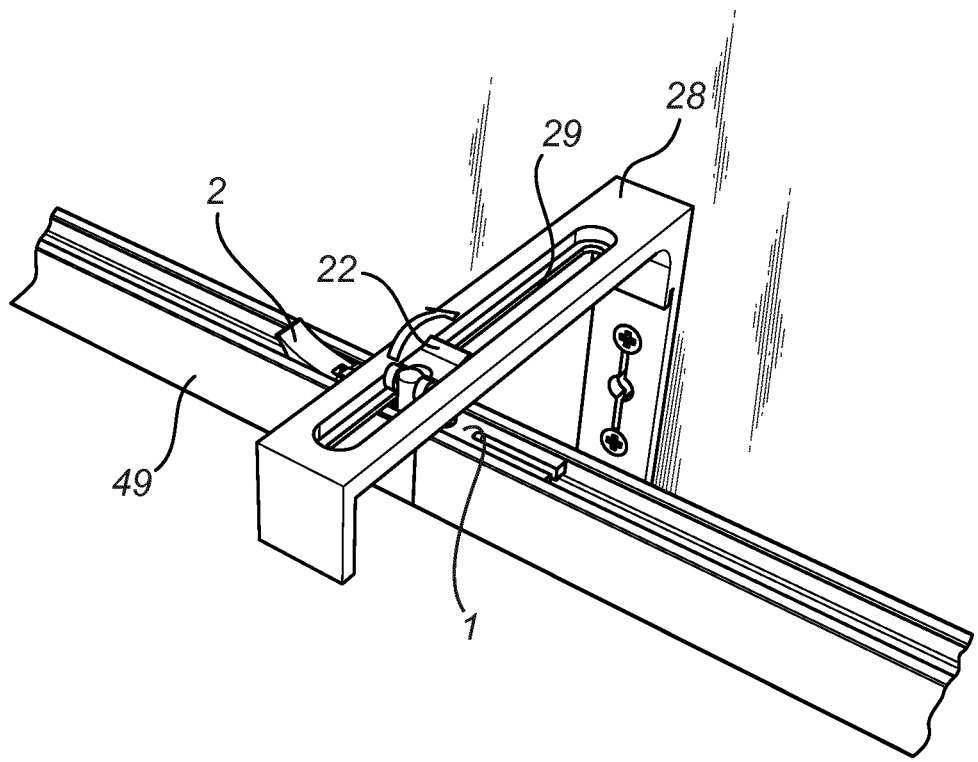

One example of use of parts the kit of the invention are illustrated in FIGS. 15a to 15i, whereby the locking element 1 according to the first embodiment is used. As shown in FIGS. 15a and 15b the end of the locking element 1 having the arm 2 is slid into the upper space 50 of the first rail 49, with the arm 2 in a lifted position. The arm 2 is less wide than the distance between the horizontal upper edges 54 of the rail 49, whereby the arm 2 can be moved free of the upper edges 54 of the rail 49 and thereby alter between a substantially horizontal position and a substantially vertical position. With the arm 2 in a lifted position the stop cam 5 at the spindle 4 is also in a lifted position, directed obliquely forward. Before sliding the locking element 1 into the rail 49 a connecting piece 21 has been inserted from below into the elongated through opening 8 of the locking element 1, whereby the plate 22 of the connecting piece 21 protrudes above the locking element 1. As indicated above half the length of the locking element 1 is slid into the rail 49. With the arm 2 still lifted there is a small distance between the locking element 1 and the upper edges 54 of the rail 49. Then the arm 2 is lowered (FIG. 15c). The width of the locking element 1 at the area of the stop cam 5 is larger than the distance between the upper edges 54 of the rail 49. When the arm 2 is in a lowered horizontal position the stop cam 5 will be pressed against the partition 53 of the rail 49 and when the arm 2 is in a raised vertical position, the stop cam 5 is no longer pressed against the partition 53 of the rail 49. In the lowered horizontal positions of the arm 2 the central part 3 of the locking element 1 will be pressed against lower surfaces of the upper edges 54 of the rail 49 by means of the stop cam 5. At the same time the central part 3 of the locking element 1 will be positioned at a distance from the partition 53 of the rail 49. Thereafter a second rail 49 is slid onto the part of the locking element 1 protruding from the first rail 49, whereby the fingers 9 of the locking element 1 will be pressed against each other (FIG. 15d). The outer ends of the fingers 9 are tapered to facilitate insertion. The outer distance between the fingers 9 is larger at the outer ends than the inner distance between the walls 52 of the upper space 50 of the rail 49. Thereby, the fingers 9 will be pressed against the walls 52 after insertion, holding the locking element 1 at the second rail 49. The bosses 7 of the fingers 9 will at the same time be rest against the partition 53 of the second rail 49.

As indicated inside the circle of FIG. 15d a locking element 1, 1a, 11 may be placed and locked anywhere along a rail 49.

Figure 15H:
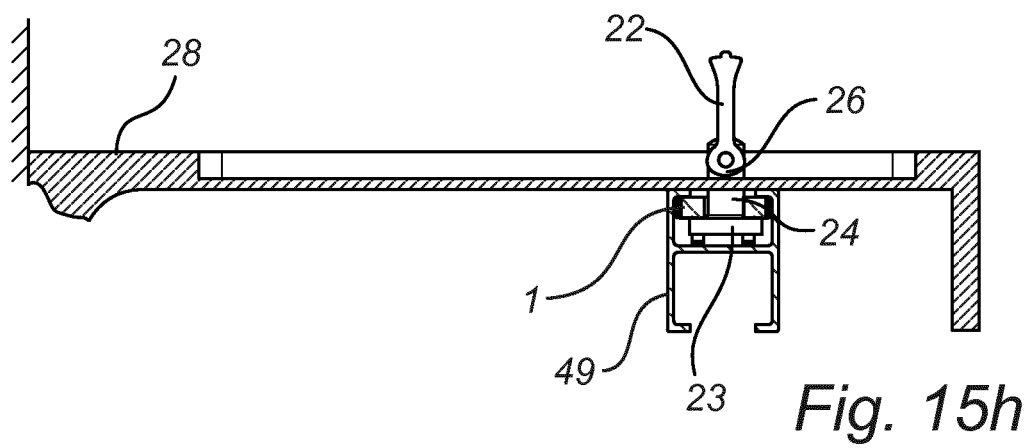
FIGS. 15h and 15i are sectional view illustrating different stages of the connection illustrated in FIGS. 15e to 15g, FIGS. 16a to 16c are perspective views illustrating one use of the locking element of the second embodiment.
Figure 15I:
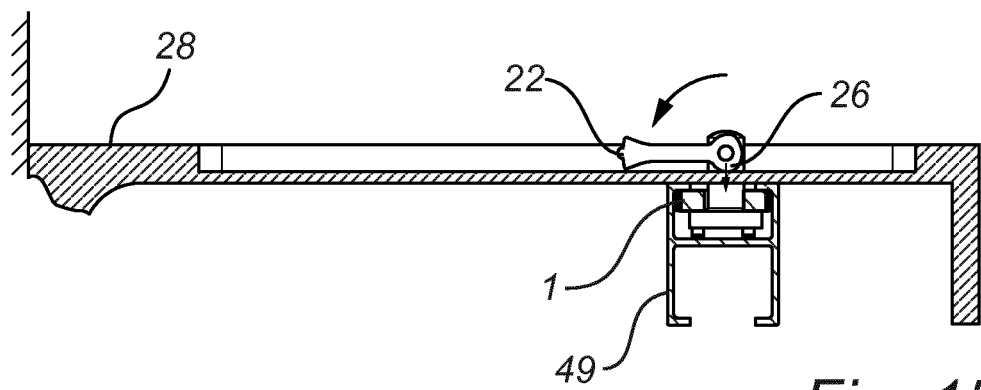

In FIGS. 15e to 15i a way of attaching the rail, formed of the two rails 49 as discussed above, to a wall bracket 28 is exemplified. The rail 49 is lifted so that the plate 22 of the connecting piece 21 is inserted from below into the elongated through opening 29 of a horizontal part of the wall bracket 28. (FIG. 15e) The plate 22 has to be turned to be parallel with the extension of the through opening 29. After insertion into the through opening 29 of the wall bracket 28, the plate 22 is turned 90° around an axis going longitudinally through the rod 24 of the connecting piece 21. (FIG. 15f) Thereafter the plate 22 is lowered to a horizontal position, in which the cams 26 of the plate 22 will be pressed against recessed parts at the sides of the through opening 29 of the wall bracket 28, locking the rail 49 to the wall bracket 28. (FIG. 15g-15i) FIGS. 15h and 15i illustrates in section the action of the cam 26 of the plate 22 of the connecting piece 21. When the plate 22 is lowered to a horizontal position the cam 26 will be pressed against the recessed parts of the through opening 29 of the wall bracket 28. Thus, the width of the plate 22 is adapted to the inner dimension of the through opening 29 of the wall bracket 28. By lifting the plate 22 to a raised position, the position of the rail 49 may be adjusted by sliding the connecting piece 21 along the through opening 29 of the wall bracket 28. The rail 49 is then locked in a new position by lowering the plate 22 to a horizontal position.

As indicated above the locking element 1,1a, 11 is not only used to connect two rails 49 to each other. It may also be used for connecting other parts to the rail 49. The locking element 1, 1a, 11 can be moved along the rail 49 and be locked in any optional position along the rail 49. The locking elements 1, 1a, 11 may for instance be used together with wall brackets 28 or ceiling attachments 33. The positions of the locking elements 1, 1a, 11 along the rail 49 may then be adapted to suitable positions for such wall brackets 28 and or ceiling attachments.

Figure 16A:
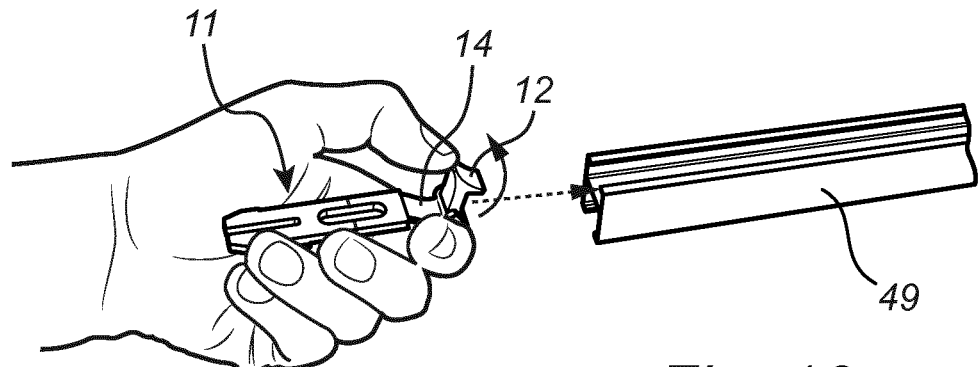
Figure 16B:
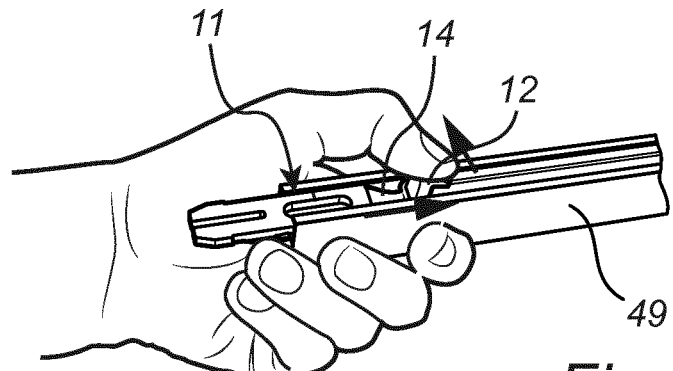
Figure 16C:
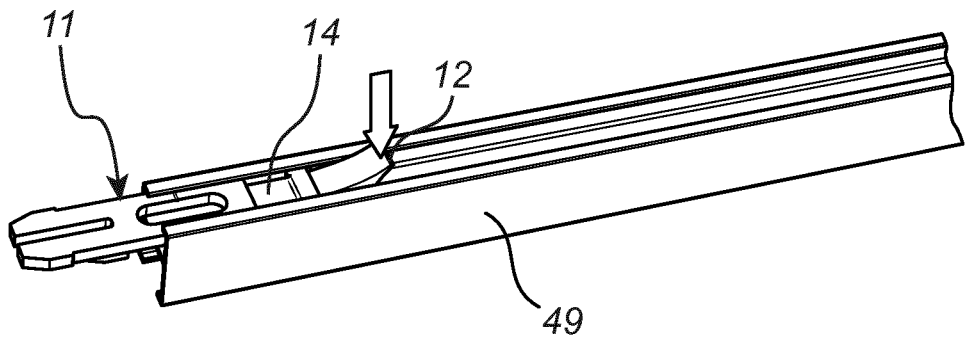

In FIGS. 16a to 16c handling of the locking element 11 according to the second embodiment, shown in FIGS. 3 and 4, is indicated. The locking element 11 will function in a similar way as described above when connecting the two rails 49 to each other. The end having the arm 12, of the locking element as shown in FIGS. 3 and 4, is first slid into the first rail 49, whereby the arm 12 is lifted in order for the stop cam 15 adjacent the intermediate bending part 14 to have a lifted position. When the locking element 11 has been slid to the desired position, halfway into the rail 49, the arm 12 is pressed down towards the rail 49, whereby the stop cam 15 will be in a vertical position. The intermediate bending part 14 has some spring action assisting in keeping the cam pressed against the rail. By means of the stop cam 15 at said arm 12, the locking element 11 is pressed against the upper edges 54 of the upper space 50 of the rail 49. The force by which the locking element is pressed against the upper edges 54 is big enough to hold the locking element in position. To release the locking element 11 the arm 12 has to be lifted. The second rail 49 is then slid onto the protruding part of the locking element 11, in the same way as described above in view of the locking element 1 of the first embodiment. The protruding parts of the locking elements 1, 11 of both shown embodiments are identical.

When the third embodiment of the locking element 1a, shown in FIG. 5, is used to connect to rails 49, 49a to each other, one end of the locking element 1a is first slid about halfway into one rail 49, 49a. When the locking element 1a is slid into the rail 49, 49a the arm 12 at the end slid into the rail 49, 49a is lifted. The arm 12 is then lowered to lock the locking element 11a in the first rail 49, 49a. The second rail 49, 49a is then slid onto the part of the locking element 1a protruding from the first rail 49, 49a. The arm 12 at the end of the locking element 1a slid into the second rail 49, 49a is in a lifted position when the second rail 49, 49a is slid onto the locking element 1a. The arm 12 is then lowered when the second rail 49, 49a abuts the first rail 49, 49a, to lock the two rails 49, 49a together.

Figure 17:
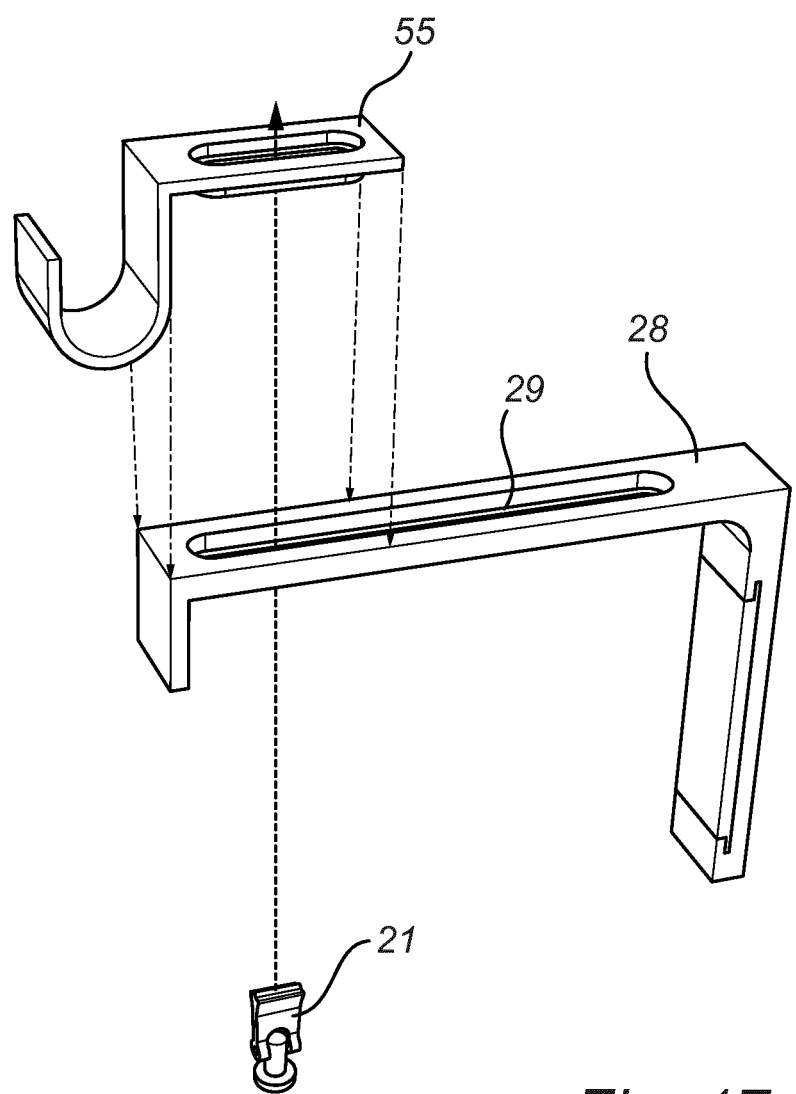
FIG. 17 is a perspective view illustrating attachment of a rail to a wall bracket using a part of the kit.

As indicated in FIG. 17 a rod holder 55 may be attached to the wall bracket 28. The rod holder 55 has a hook part and a horizontal part, which horizontal part has an elongated through opening. The rod holder 55 is connected to the wall bracket 28 by means of the connecting piece 21. To connect the rod holder 55 to the wall bracket 28, the rod holder 55 is placed on top of the wall bracket 28, in such a position that the elongated through opening of the rod holder 55 is placed directly over the elongated through opening 29 of the wall bracket 28. Then the plate 22 of the connecting piece 21 is inserted through the through openings of the wall bracket 28 and the rod holder 55, respectively. The connection piece 21 is inserted from below and is pushed upwards until the disc 23 of the connection piece 21 will abut a lower surface of the wall bracket 28. The connection piece 21 is thereafter rotated 90° and the plate 22 is turned to a horizontal position, in which position the cams 26 of the plate 22 is pressed against recessed portions at the sides of the elongated opening of the rod holder 55. The rod holder 55 is to receive a curtain rod. In the same way as stated above the widths of the elongated opening 29 of the wall bracket 28 and the opening of the rod holder 55 are adapted to the dimensions of the disc 23 and the plate 22, respectively, of the connecting piece 21.

Figure 18A:
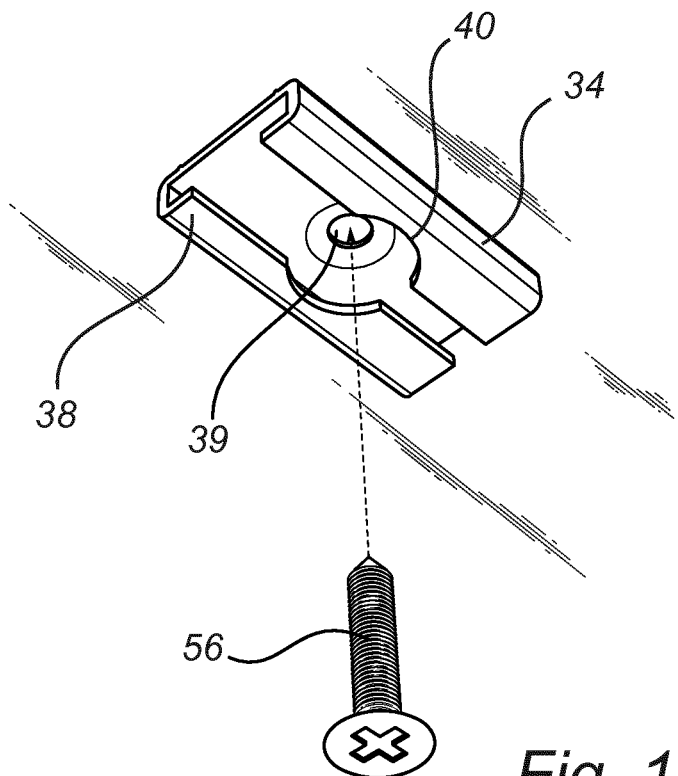
FIGS. 18a to 18g illustrates steps in attaching a rail to a ceiling, where some Figs. are partly in section, and FIGS. 19a and 19b indicates curtains hanged with use of the kit of the present invention.
Figure 18B:
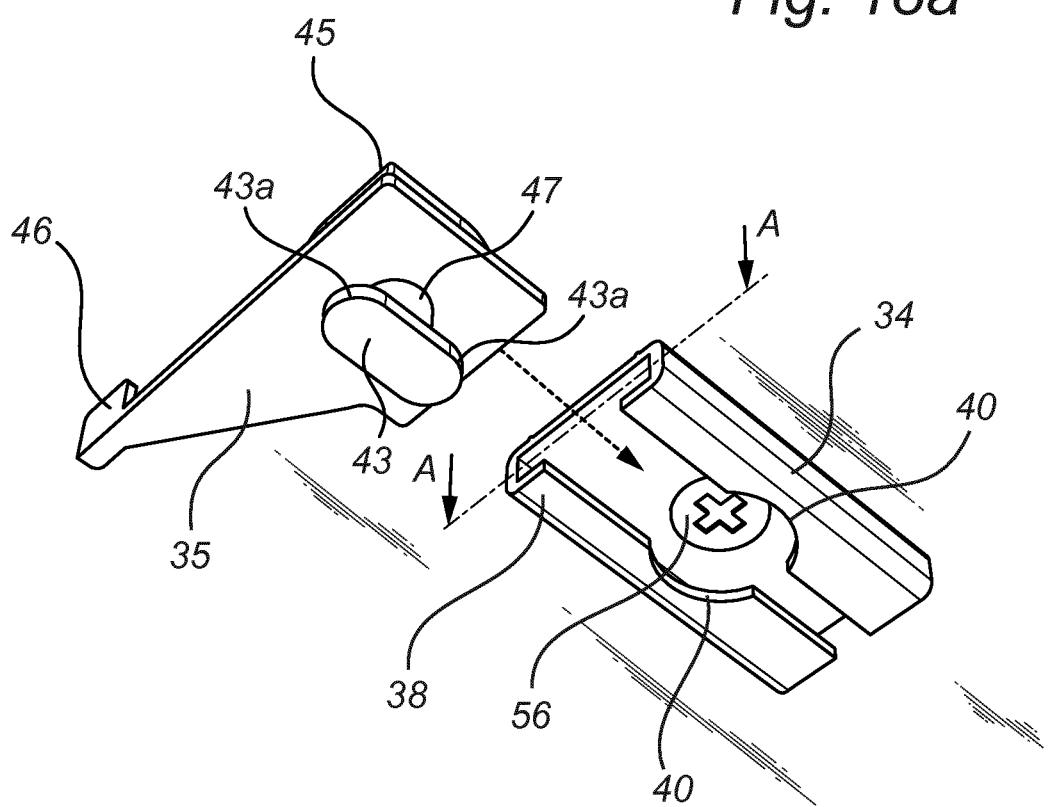
Figure 18C:
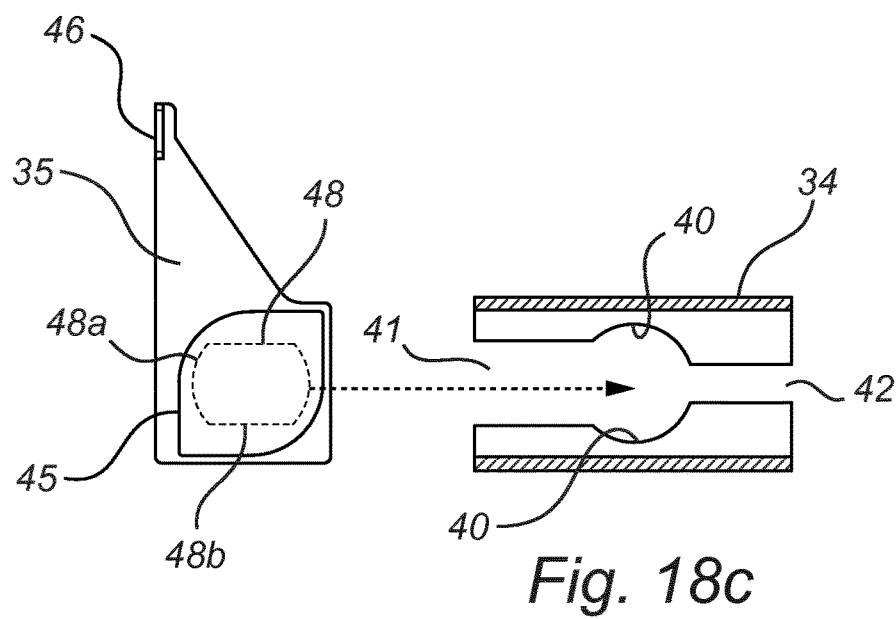
Figure 18D:
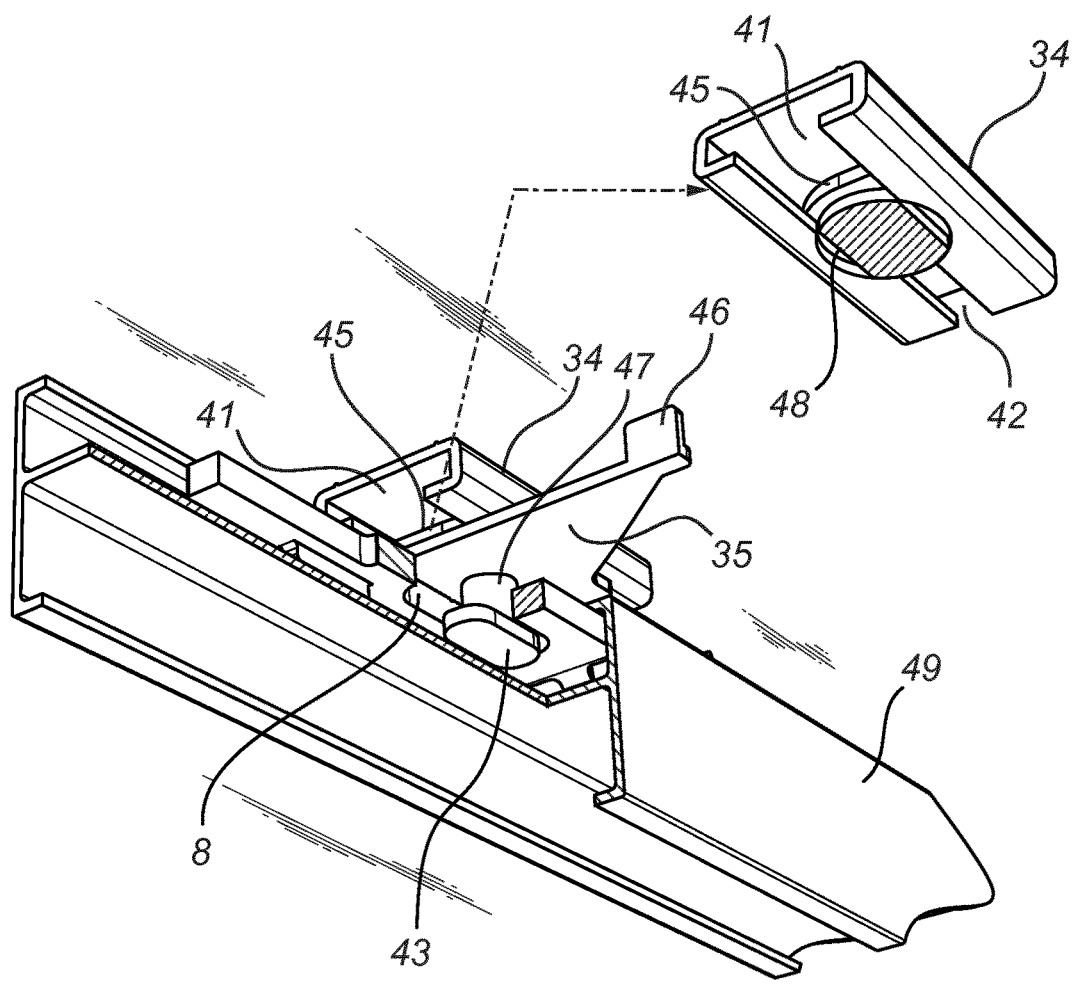
Figures 18E, 18F:
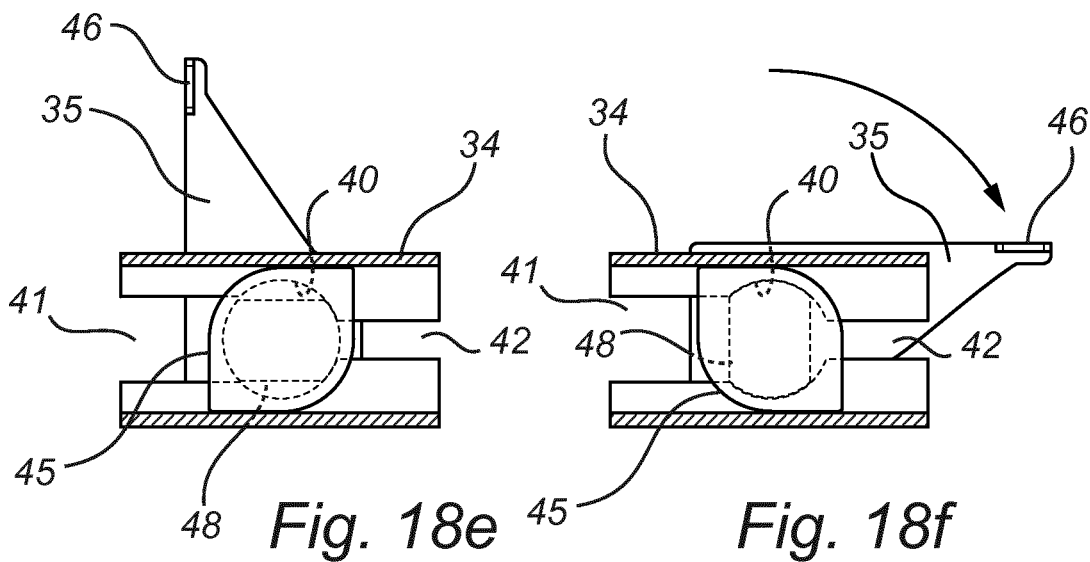
Figure 18G:
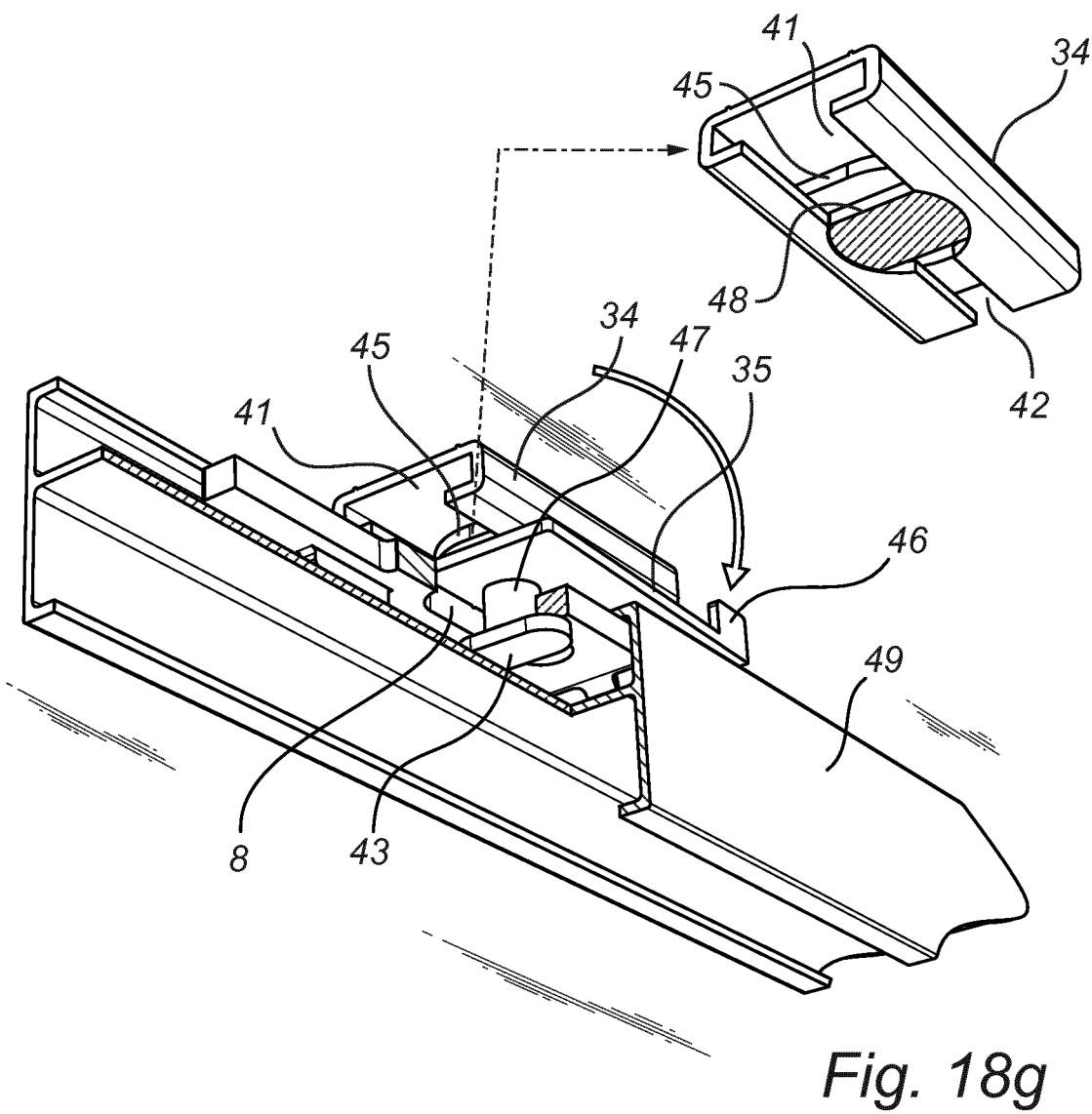

In FIGS. 18a to 18g one example of fixing a rail 49 to a ceiling is indicated. The first step is to fasten the house 34 of the ceiling attachment 33 to the ceiling by means of a screw 56, as indicated in FIG. 18a. A person skilled in the art realizes that the house may be arranged with more than one opening for receiving screws. As shown in FIGS. 18b and 18c the attachment element 35 of the ceiling attachment 33 is then slid into the wide groove 41 of the house 34. In order to slide the attachment element 35 into the wide groove 41 of the house 34, the straight sides 48b of the upper rod 48 connecting the central part 44 with the locking plate 45 has to be parallel with the sides of the wide groove 41. The straight sides 48b of the upper rod 48 are parallel with the sides of the wide groove 41 when the attachment element 35 is perpendicular to the house 34. The outer distance between the curved sides 48a of the upper rod 48 is larger than the distance between the sides of the wide groove 41. The locking plate 45 is received between the flat part 36 and the flanges 38 of the house 34. The attachment element 35 is slid into the house 34 until the upper rod 48 is in the recess 40 between the wide groove 41 and the narrow groove 42 of the house 34. (FIG. 18d, 18e) The upper rod 48 is too wide to continue into the narrow groove 42 irrespectively of the positions of the curved and straight sides 48a, 48b of the upper rod 48. The next step is to connect the rail 49 to the ceiling attachment 33. The attachment plate 43 of the attachment element 35 is to be received in the elongated through opening 8, 18 of a locking element 1, 1a, 11 placed at an appropriate location in the rail 49. The rail 49 is lifted up to the ceiling attachment 33 in such a way that the attachment plate 43 of the attachment element 35 goes into the through opening 8, 18 of the locking element 1, 1a, 11. By gripping the flange 46 the attachment element 35 is then turned, until the attachment element 35 is in parallel with the house 34. Thereby the attaching plate 43 will be perpendicular to the elongated through opening 8, 18 and be placed between the locking element 1, 1a, 11 and the partition 53 of the rail 49. The rail 49 will thereby be held at the ceiling attachment 33 (FIGS. 18f, 18g). By the turning of the attachment element 35 to be parallel with the house 34, the curved sides 48a of the upper rod 48 between the locking plate 45 and the central part 44 will also be parallel with the house 34. As the upper rod 48 cannot go into the wide groove 41 in that position, any sliding between the ceiling attachment 33 and the rail 49 is prevented. The length of the minor axis of the elliptic rod 47 is smaller than the inner width of the elongated through opening 8, 18 of the locking element 1, 1a, 11. The length of the major axis of the elliptic rod 47 is somewhat larger than the inner width of the elongated through opening 8, 18 of the locking element 1, 1a, 11. Thus, the elliptic rod 47 will be pressed against the inner sides of the elongated through opening 8, 18 when the attachment element 35 is turned to be parallel with the house 34, counteracting movement of the rail 49 in relation to the ceiling attachment 33. To loose the rail 49 from the ceiling attachment 33 the attachment element 35 is turned back to a position where it is perpendicular to the house 34. In that position the attaching plate 43 is free of the sides of the elongated through opening 8, 18 of the locking element 1, 1a, 11 and, thus, the rail 49 is free of the ceiling attachment 33.

A person skilled in the art realizes that the same technique can be used to fix a rail 49, 49a to a wall.

Figure 19A:
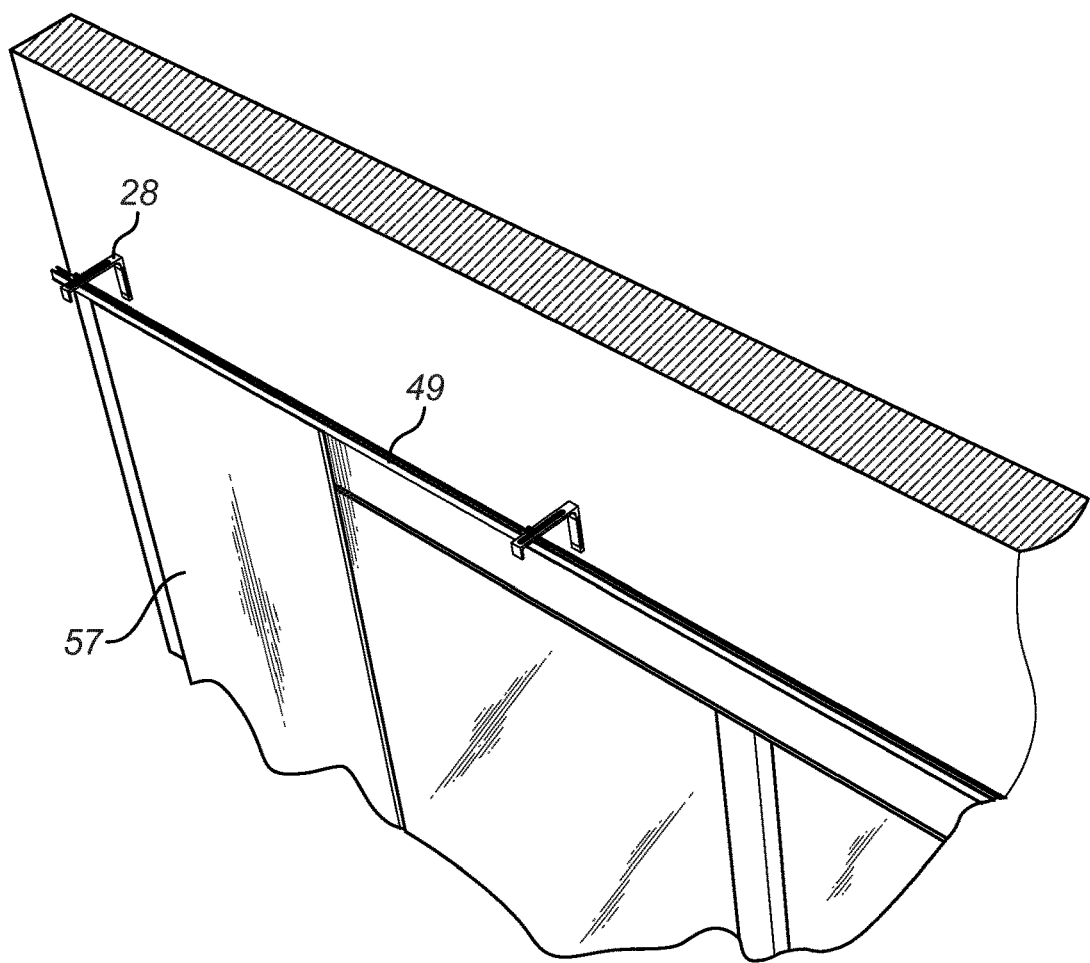
Figure 19B:
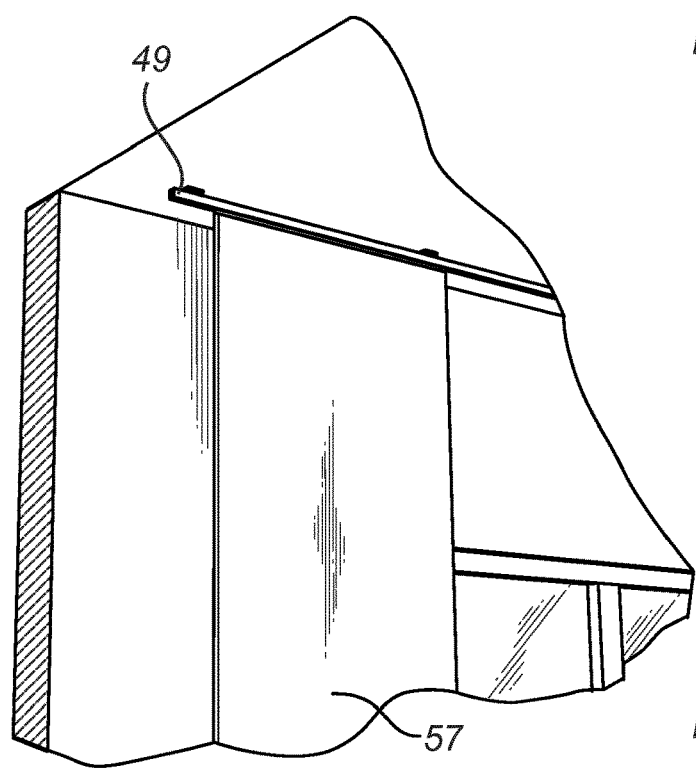

FIGS. 19a and 19b illustrates one example of a curtain 57 hanging in a rail 49. The rail 49 is held at the wall by means of wall brackets 28.

The invention claimed is:

1. A kit of a hanging system, the hanging system comprises one or more rails, wherein the kit comprises one or more locking elements, one or more connecting pieces, and one or more ceiling attachments, wherein each locking element and each connecting piece are either used separately or together and each ceiling attachment is used together with a locking element, wherein the locking element is received in said one rail or in two rails to connect said two rails to each other and wherein the locking element is lockable in a desired position along the rail, wherein each of said rail has parallel walls projecting from a partition of the rail, which walls have edges at the free ends and which edges are directed towards each other and are arranged perpendicular to the projecting walls, wherein a distance is formed between the edges, wherein the locking element is placed between the partition and the edges of the walls, and wherein the locking element is pressed between the partition and the edges of the walls in a locked condition for the locking element.

2. The kit of claim 1, wherein the connecting piece is connected to the locking element, by means of a disc of the connecting piece to be placed between the locking element and the rail.

3. The kit of claim 2, wherein the rail is connected to a wall bracket in that the connecting piece, connected to the locking element, is locked in a elongated opening of the wall bracket.

4. The kit of claim 2, wherein the connecting piece is received in an elongated opening with a plate of the connecting piece and the disc of the connecting piece placed at opposite sides of the elongated opening and which plate is pressed against parts adjacent the elongated opening.

5. The kit of claim 1, wherein the ceiling attachment is connected to the locking element by means of a part placed between the rail and the locking element, when the locking element is placed in the rail and wherein the ceiling attachment has means to fastened it to a ceiling or wall.

6. The kit of claim 1, wherein the rail is a curtain rail for one or several curtains.

7. A locking element of a hanging system, the locking element comprising at least one arm at one end of a central part and that the central part has an elongated through opening, wherein said each arm is connected to the central part by means of a spindle, and wherein the arm has a stop cam at the connection to the central part, which stop cam will project below the central part when the arm is in a horizontal position, parallel with the central part, and which said stop cam will be on level with the central part when the arm is in a vertical position.

8. The locking element of claim 7, wherein the central part has two fingers at the end opposite the end having the arm, wherein the fingers have bosses in the area where the central part merges with the fingers, and wherein there is a gap between the fingers.

9. The locking element of claim 7, wherein the locking element comprises two arms at opposite ends of the central part.

10. The locking element of claim 7, wherein the arm can be turned on the spindle in relation to the central part.

11. The locking element of claim 7, wherein the arm is made in one piece with the central part, wherein an intermediate bending part is placed between the arm and the central part, and wherein the arm has a stop cam placed adjacent the intermediate bending part and has a width corresponding with the width of the central part and larger than the widths of the arm and the intermediate bending part, respectively.

12. A connecting piece of a hanging system comprising a plate, a rod and a disc, that the plate and disc are placed at opposite ends of the rod, that the disc has an outer diameter exceeding an outer diameter of the rod and that the plate is connected to a spindle at an upper part of the rod in such a way that the plate may be turned on the spindle.

13. The connecting piece of claim 12, wherein the plate has cams placed at the connection with the spindle.

14. The connecting piece of claim 12, wherein the rod and the disc are made in one piece.

15. The ceiling attachment of claim 14, wherein the locking plate of the attachment element is received between the flat part and the flanges of the house, and wherein the outer dimensions of the locking plate exceeds the distance between the flanges of the house.

16. The ceiling attachment of claim 15, wherein the outer distance between the curved sides of the upper rod, connecting the central part of the attachment element to the locking plate, is larger than the distance between the flanges in the wide groove of the house and smaller than the inner distance between the flanges at the recesses and wherein the outer distance between the straight sides of the upper rod, connecting the central part of the attachment element to the locking plate, is smaller than the distance between the flanges in the wide groove of the house and larger than the distance between the flanges in the narrow groove of the house.

17. A ceiling attachment of a hanging system comprising a house and an attachment element and that the house comprises a through opening for receiving a screw, wherein the house comprises a flat part, two side walls at opposite sides of the flat part and two flanges at the side walls opposite the flat part, wherein the side walls are perpendicular to the flat part and the flanges, respectively, wherein the through opening is placed in the middle of the flat part, wherein each flange has a curved recess, wherein the curved recesses are placed opposite each other in the area of the through opening of the flat part, and wherein a groove for receiving the attachment element is formed between the free edges of the flanges.

18. The ceiling attachment of claim 17, wherein the width of each flange differs on opposite sides of the curved recess, whereby the groove formed between the free edges of the flanges have different widths, giving a comparatively wide groove on one side of the recesses and a comparatively narrow groove on the other side of the recesses.

19. The ceiling attachment of claim 17, wherein the attachment element has a central part with an attaching plate on one side and a locking plate on the opposite side of the central part, wherein the locking plate is connected to the central part by means of an upper rod, wherein said upper rod has a cross-section with two opposite curved sides and two opposite straight sides, wherein the outer distance between the curved sides of the upper rod is larger than the outer distance between the straight sides of the upper rod.

20. The ceiling attachment of claim 19, wherein the attaching plate of the attachment element is connected to the central part by means of an elliptic rod, wherein the attaching plate and the locking plate, respectively, are arranged in parallel with and at distances to the central part and wherein the attaching plate has the form of two pins projecting from opposite sides of the elliptic rod.

* * * * *